United States Patent [19]
Thielman

[11] Patent Number: 5,930,041
[45] Date of Patent: Jul. 27, 1999

[54] METHOD OF PRODUCING CELLULAR RETROREFLECTIVE SHEETING

[75] Inventor: W. Scott Thielman, Arlington Heights, Ill.

[73] Assignee: Stimsonite Corporation, Niles, Ill.

[21] Appl. No.: 09/121,937

[22] Filed: Jul. 24, 1998

Related U.S. Application Data

[62] Division of application No. 08/566,006, Dec. 1, 1995.

[51] Int. Cl.⁶ ...................................................... G02B 5/124
[52] U.S. Cl. ......................... 359/530; 359/529; 359/900; 264/1.9
[58] Field of Search ...................................... 359/529, 530, 359/900; 264/1.9, 2.7, 284; 425/373, 374, 383–385

[56] References Cited

U.S. PATENT DOCUMENTS

| | | |
|---|---|---|
| 1,906,655 | 5/1933 | Stimson . |
| 3,332,327 | 7/1967 | Heenan . |
| 3,922,065 | 11/1975 | Schultz . |
| 3,924,929 | 12/1975 | Holmen et al. . |
| 4,025,159 | 5/1977 | McGrath . |
| 4,460,449 | 7/1984 | Montalbano . |
| 4,601,861 | 7/1986 | Pricone et al. . |
| 4,618,518 | 10/1986 | Pricone et al. . |
| 4,637,950 | 1/1987 | Bergeson et al. . |
| 4,653,854 | 3/1987 | Miyata . |
| 4,895,428 | 1/1990 | Nelson et al. . |
| 5,138,488 | 8/1992 | Szczech . |
| 5,171,624 | 12/1992 | Walter . |
| 5,264,063 | 11/1993 | Martin . |
| 5,272,562 | 12/1993 | Coderre . |
| 5,450,235 | 9/1995 | Smith et al. . |

FOREIGN PATENT DOCUMENTS

| | | |
|---|---|---|
| 1476447 | 6/1977 | United Kingdom . |
| WO9511464 | 4/1995 | WIPO . |

*Primary Examiner*—James Phan
*Attorney, Agent, or Firm*—Jones, Day, Reavis & Pogue

[57] ABSTRACT

Cellular retroreflective sheeting comprises a first film of thermoplastic material which has been formed to define arrays of minute cube-corner reflective elements on one face thereof. The reflective elements are covered with a second thin thermoplastic film and the two films together pass over a patterned roller where a series of sonic welding heads rapidly bond the films together forming small cells of retroreflective cube-corner elements in the pattern of the roller. Because the heat generated in the welding process is localized to the pattern of the roller, cell walls may be formed having narrow thickness yet good bonding of the films is achieved. Further, residual heat does not appreciably transfer to adjacent retroreflective elements, therefore, distortion of adjacent elements is minimized and a sheeting construction is achieved having superior brilliance and durability as well as maximum retroreflective capability over a wide angular range of incident light. Also disclosed is a method for forming such sheeting.

7 Claims, 4 Drawing Sheets

METHOD OF PRODUCING CELLULAR RETROREFLECTIVE SHEETING

This is a divisional of copending application Ser. No. 08/566,006 filed on Dec. 1, 1995, pending.

BACKGROUND OF THE INVENTION

1. Field of the Invention

The present invention relates generally to construction of sheeting having the capability of retroreflecting incident light and, more particularly, to a cellular retroreflective sheeting having enhanced reflective characteristics through wide angles of incident light while, at the same time, having improved bonding strength of its composite layers.

2. Description of the Prior Art

Retroreflective devices have been advantageously used for many years to improve highway safety in many parts of the world. Devices such as pavement markers, automobile reflectors, post markers and highway signage, for example, have been constructed using various retroreflective devices which reflect incident light from vehicle headlight beams back to the driver and serve during low ambient light driving conditions to inform the driver of approaching danger or other highway conditions.

One form of retroreflective device is known as a cube-corner type reflector. This device typically comprises an array of several "cube" elements each consisting of three mutually perpendicular faces which serve to receive incident light and retroreflect the light through 180° approximately parallel to its incident path and back to its source. The term "cube-corner" has long been recognized in the art to refer to essentially any structure of three mutually perpendicular faces without regard to the size or shape of each face or the optical axis of the element so provided. An early example of a cube-corner type reflector is disclosed in Stimson, U.S. Pat. No. 1,906,655, issued May 2, 1933. Another example is in Hennan, U.S. Pat. No. 3,332,327 issued Jul. 25, 1967, both of which teach a pavement marker construction.

In pavement marker construction, the cube corner elements may be relatively large in size because the marker is constructed to be a rigid assembly capable of withstanding vehicle loads and tire impact. However, an important application for cube-corner type reflective elements has been developed in the area of retroreflective sheeting. Retroreflective sheeting is particularly useful in the construction of highway signage, for example, in which an aluminum sign blank is covered with a layer of light reflective sheeting bearing suitable indicia for informing drivers of a particular highway condition.

Unlike pavement marker applications for cube-corner type reflective elements, in reflective sheeting applications the cube-corner elements are reduced in size to be useable on a relatively thin film substrate. Preferably, the sheeting must be flexible and capable of being produced and supplied in roll form. To this end, methods have been developed to form thin film materials with retroreflective elements such as by embossing or casting. Typically, the sheeting comprises a transparent acrylic substrate, or film, although various other forms of thermoplastic material may be used as polycarbonate, vinyl, polyethylene or polyurethane, for example.

An example of a highly efficient method and apparatus for continuous embossing of a resinous film with cube-corner retroreflective elements is disclosed in Pricone et al., U.S. Pat. No. 4,601,861, the disclosure of which is incorporated herein by reference. In this process, a continuous web of transparent film is fed through an embossing machine in which the film is heated to a transition temperature and compressed by an embossing tool such that resinous film material flows into the pattern of the tool. The film is then cooled, quenched and stripped from the tool. The tool may be constructed by a process of the type disclosed in Montalbano, U.S. Pat. No. 4,460,449, the disclosure of which is incorporated herein by reference. The tool of this patent is capable of creating very small, accurately formed cube-corner elements on the order of several thousand per square inch of film.

It is well known that cube-corner elements are orientation sensitive and have varying degrees of reflectivity depending upon the angle of the incident light. Accordingly, one generally accepted practice in the construction of cube-corner sheeting is to construct master tool blocks on the order of one-quarter inch or so square with the cube prisms tilted on the order of approximately six degrees. Then, using multiple master blocks, each in a different rotational orientation, multiple matrices or grids of cube-corner reflective elements may be formed in the film such that the resulting sheeting is highly reflective, overall, over a wide range of orientation angles.

In using a cube-corner system to construct retroreflective sheeting, it is generally understood that the rear surfaces of the cube elements must either be metalized or supported with an air gap between any adjacent rear support surface. This is so because essentially any material other than a reflective metal coating placed in intimate contact with the rear surfaces of the cubes will have a refractive index such that the focal point of the cube element will be altered. Accordingly, metalization of the rear surfaces of cube-corner elements has been practiced to allow the element substrate to be bonded to a suitable rear support layer. In practice, a rear support layer is essential to protect the reflective elements and provide a sheeting surface which may be readily secured as with adhesive to a sign blank or the like. Metalization may readily be performed by known aluminum or silver vapor deposition techniques, for example.

A known disadvantage of metalization in the construction of retroreflective sheeting is that the metallic reflective layer imparts a distinct grayish tint to the resulting sheeting. This grey appearance of the sheeting has been found undesirable for highway signage, particularly during daytime light conditions. An air gap system, in which the cube elements are spaced from the rear layer, on the other hand, creates a sheeting having enhanced brilliance over metalized products. Accordingly, attempts have been made to construct sheeting using an air gap system in some form.

In one form of an air gap system as disclosed in Pricone, U.S. Pat. No. 4,618,518, a web of transparent thermoplastic material is first embossed with cube-corner reflective elements and the elements are overcovered in a pattern as by printing with a slurry of mineral spirits, alcohol and hydrophobic silica powder to create small islands of silica covering the surfaces of a number of the cube corner elements. Because the silica is water-resistant, a layer of water based acrylic is then flooded over the silica creating a continuous surface coating and forming cell walls around the silica in a desired printed pattern. The silica granules, which contact the cube faces only tangentially, maintain an air gap and allow the elements to be hermetically sealed by the acrylic coating. Thus, an acceptably reflective sheeting product may be achieved in which the sheeting has a suitable rear support layer, while employing the desired air gap system. An appropriate cell size is chosen so that breaking the seal of the cells by cutting the sheeting to size will result in only minor contamination of reflective elements at the very edges of the sheeting form and an edge sealing step is avoided. However, a disadvantage of this construction is that to obtain adequate mechanical bonding of the acrylic support layer, the cell walls formed around the silica filler, in practice, must have a wall thickness on the order of 0.035 inch (0.9 mm). This is necessitated by the extreme conditions under which the resulting sheeting is expected to perform, such as rapid and severe expansion and contraction of an associated sign blank, for example. Moreover, with cell walls of at least 0.035 inch (0.9 mm) thickness, it has been found that the resulting sheeting with silica backing has reduced efficiency at 30° and greater incident angles. Accordingly, this type of sheeting may not meet certain reflectivity standards for use in some highway signage applications.

In another form of an air gap system as used with cube-corner reflective elements, a web of reflective elements is formed having cell walls surrounding a plurality of cube elements. A flat cover sheet is applied covering the cell walls and the assembly is chemically and/or heat fused to bond the web to the cover sheet. The result is a sheeting having many small cells defining air gaps between the reflective elements and the cover sheet. An example of this construction is disclosed in McGrath U.S. Pat. No. 4,025,159. However, a disadvantage of this construction is that when heat treating is used to bond the web and cover layer the process is very difficult to control to avoid heat from distorting the cube-corner elements adjacent the cell walls during bonding. Cube-corner elements inherently must have their three reflective faces oriented within a few minutes of perpendicular or else they cannot be retroreflective. Thus, the heat needed to bond the reflective web and cover layer, which is necessarily in the range of 200–500° F., can destroy enough cube-corner elements as to render 20–30% of the resulting sheeting product completely non-reflective. Moreover, when chemical processes are used to bond the web to the cover sheet, not only are these processes complicated and time consuming they typically are accompanied by adverse environmental impact if not carefully controlled. Another version purportedly of flexible sheeting is disclosed in U.K. Patent No. 1,476,447, also referencing heat sealing.

In a more recent patent application filed under the Patent Cooperation Treaty as Serial No. WO95/11464, published Apr. 27, 1995, some passing reference is made to using radio frequency or ultrasonic welding to form cells of cube-corner retroreflective elements on retroreflective sheeting. However, this reference is merely prophetic and no associated disclosure of such welding processes is provided. That application in fact describes the best mode as being thermal fusion techniques. Indeed, in practice, it has not been heretofore known to use radio frequency or ultrasonic welding techniques to continuously manufacture commercially viable retroreflective sheeting products.

Accordingly, it is desirable to provide retroreflective cube-corner type sheeting using an air gap system. It is further desirable to provide such sheeting in which arrays of small cells each enclose plural reflective elements of a substrate film in a hermetically sealed construction wherein only minor contamination of the sheeting edges can occur after the sheeting is cut to size.

Still further, it is desirable to provide such sheeting in which a cover layer is firmly bonded to the substrate layer such that the cover layer will not detach from the associated substrate layer under adverse conditions encountered, for example, in highway signage applications.

It is further desirable to provide such sheeting in which the bonding of the substrate and cover layers will not affect the retroreflectivity of the cube corners as the incident angle of the light is increased. Further, it is desirable to provide such sheeting in which the substrate and cover layers are bonded without appreciable destruction of cube-corner reflective elements whereby the number of functioning elements in the sheeting is correspondingly maximized.

Further, it is desirable to provide such sheeting which is capable of being produced continuously at high production rates and which does not involve potential adverse environmental effects in the production process.

SUMMARY OF THE INVENTION

The present invention overcomes the disadvantages of the prior art by providing a retroreflective sheeting comprising a film of thermoplastic material which is formed by known methods to define arrays of minute cube-corner reflective elements on one face thereof. The reflective elements are covered with a second thin film and the two films together pass over a patterned roller at which point a series of ultrasonic welding heads rapidly bond the films together forming small cells of retroreflective cube corner elements in the pattern defined by the roller. Because the heat generated in the ultrasonic welding process is localized to the pattern of the roller, cell walls may be formed having reduced thicknesses and heat does not appreciably transfer to adjacent reflective elements, whereby distortion of adjacent elements is minimized and a sheeting construction is achieved having considerable brilliance and also maximum retroreflective capability over a wide angular range of incident light.

BRIEF DESCRIPTION OF THE DRAWINGS

The foregoing and other novel features and advantages of the invention will be better understood upon a reading of the following detailed description taken in conjunction with the accompanying drawings wherein.

DETAILED DESCRIPTION OF THE PREFERRED EMBODIMENTS

Figure 1:
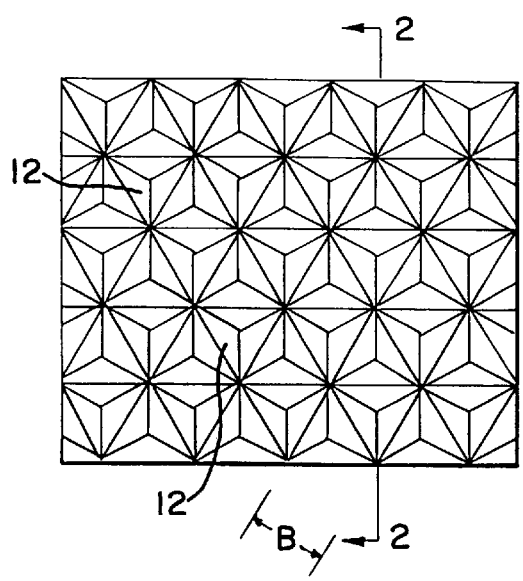
FIG. 1 is an enlarged plan view of the rear surface of a portion of a prior art film substrate for use in retroreflecting sheeting which has been embossed or otherwise formed with cube-corner retroreflective elements.
Figure 2:
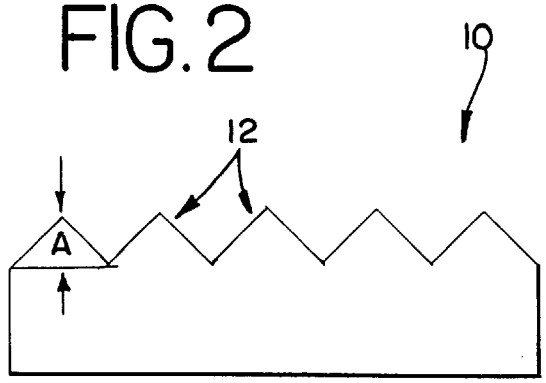
FIG. 2 is a cross-sectional view taken substantially along the line 2—2 of FIG. 1.

Referring now to the drawings, and initially to FIGS. 1 and 2, a prior art film 10 of the type used to construct cube-corner type retroreflective sheeting is shown in enlarged scale. The film 10 has been embossed on one side by known methods with a repeating pattern of retroreflecting cube-corner type reflector elements 12 and may advantageously be acrylic having a thickness on the order of 0.006 inch (0.15 mm). The depth of the cube-corner elements as indicated by dimension A may, in one example, be 0.00338 inch (0.08 mm). Corresponding dimension B, which represents the distance between parallel grooves, would be on the order of 0.0072 inch (0.18 mm) for the A dimension provided. A web of sheeting, bearing a protective carrier film from the embossing process, such as disclosed in Pricone U.S. Pat. No. 4,618,518, is then available for further processing. In this example, the number of retroreflective elements 12 will approximate 22,000 per square inch (3,400 per square cm) of film 10.

Figure 3:
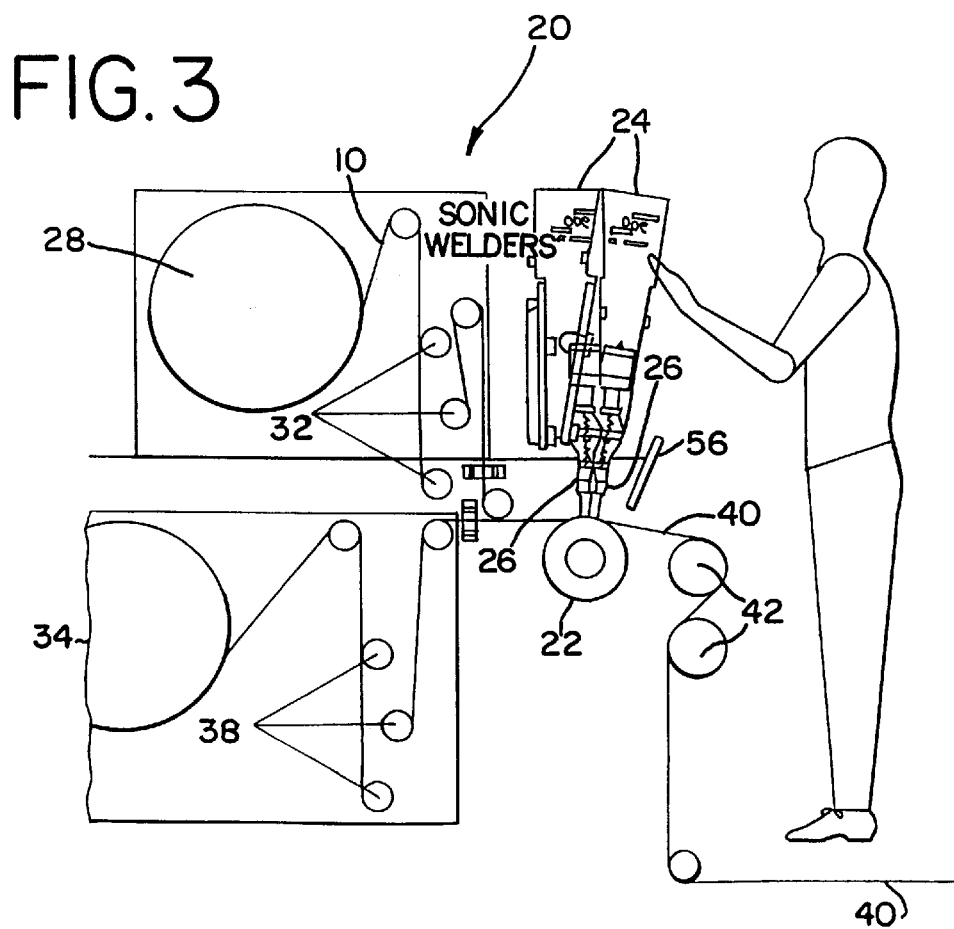
FIG. 3 is a side schematic view of an apparatus for constructing hermetic cellular retroreflective sheeting in accordance with the principles of the present invention.
Figure 4:
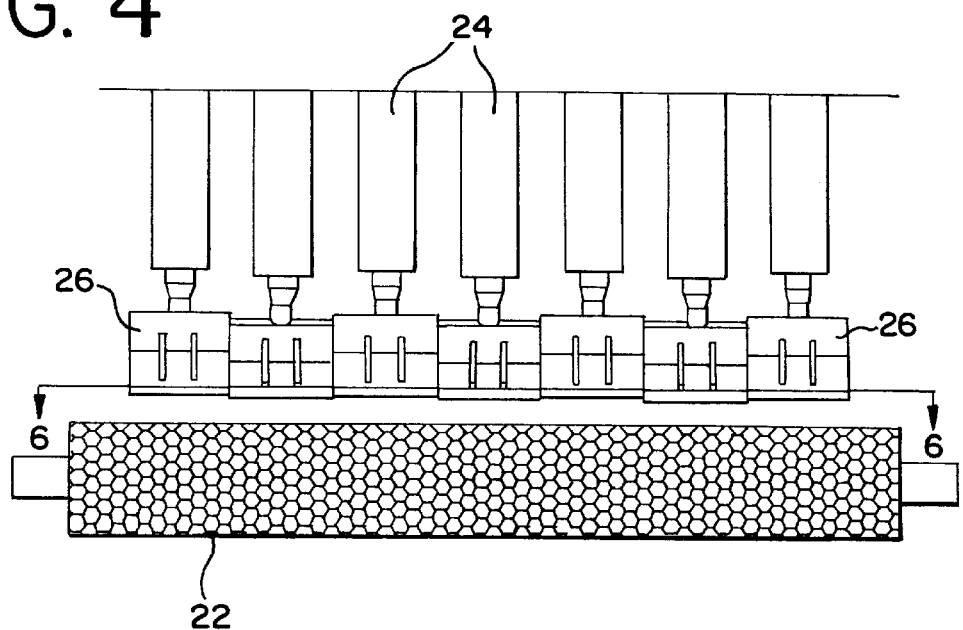
FIG. 4 is a side elevational view of the welding station of the present apparatus.
Figure 5:
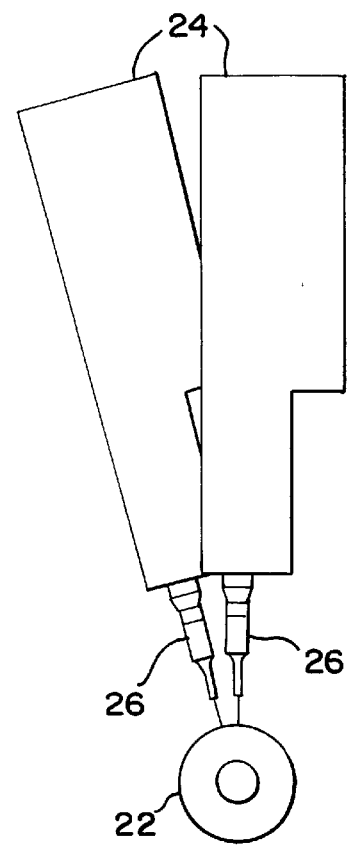
FIG. 5 is an end view thereof.
Figure 6:
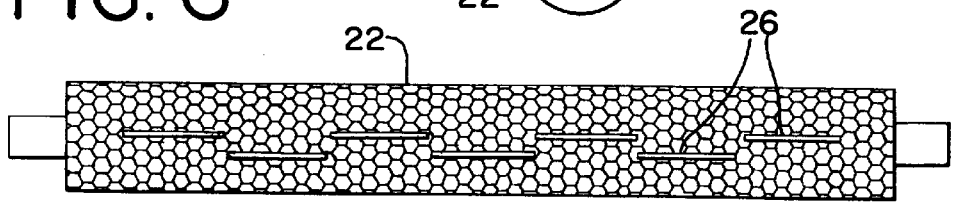
FIG. 6 is a cross-sectional view taken substantially along the line 6—6 of FIG. 4.
Figure 7:
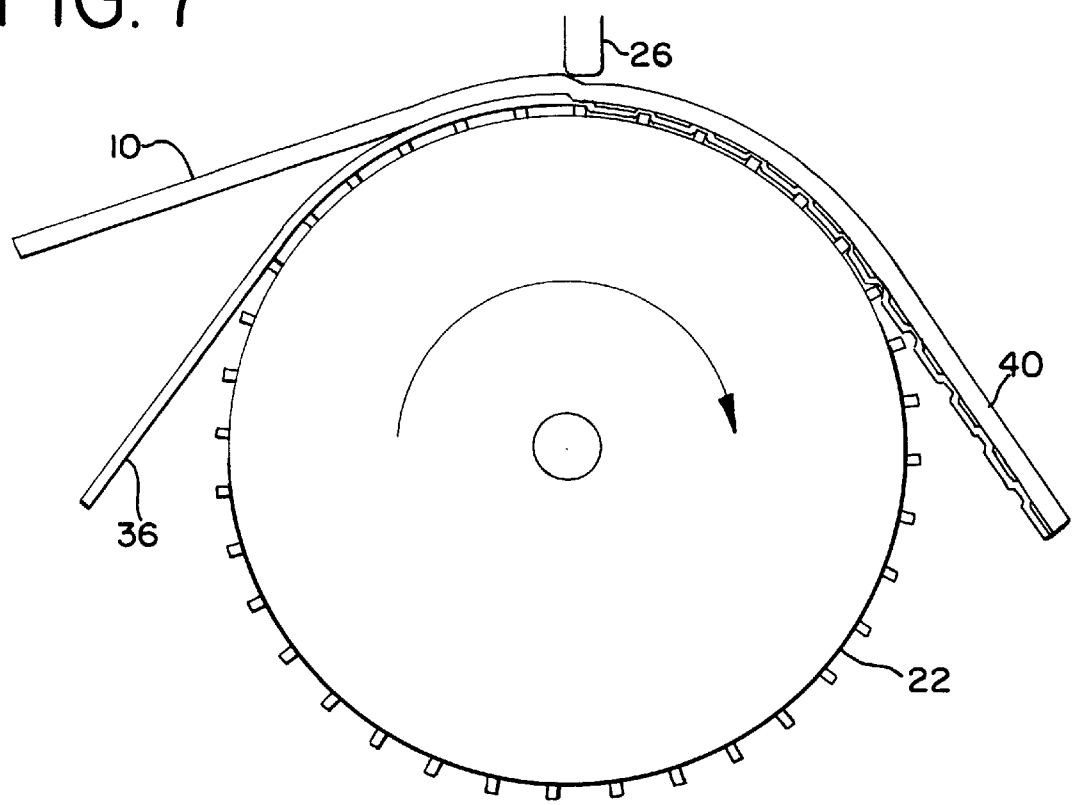
FIG. 7 is a schematic end view of a patterned roller constructed in accordance with the invention showing cellular retroreflective sheeting being formed thereby.

A machine for constructing the hermetic cellular retroreflective sheeting in accordance with the present invention is illustrated in FIG. 3 and designated generally by the reference numeral 20. The machine 20 comprises as a principal component a patterned roller 22 suitably journaled for rotation, the function of which will be described in detail hereinafter. Positioned above the roller 22 are a plurality of sonic welding heads 24 each having a welding horn 26 disposed in close proximity to the surface of the roller 22.

A reel 28 of continuous, previously embossed film 10 (still supported by a carrier film) constructed as heretofore discussed is suitably supported such that film 10 may pass over tensioning rollers 32 disposed ahead of the welding heads 24. The film 10 may be on the order of forty-eight or so inches wide (122 cm), with the aforesaid number of elements 12 approximating 22,000 per square inch (3,400 per square cm) of film 10.

A supply reel 34 of similar width flat backing film 36 is also supported such that backing film 36 may pass over tensioning rollers 38 ahead of the welding heads 24. The two films 10 and 36 join together and pass between the welding horns 26 and the patterned roller 22 whereupon they are sonically welded together creating finished cellular retroreflective sheeting 40. Suitable drive rollers 42 are provided to draw the finished sheeting 40 at a uniform rate of speed through the machine 20. The sheeting 40 may then travel to a suitable take-up reel (not shown).

Details of the welding station of the machine 20 can be seen in FIGS. 4–7. As illustrated therein, the welding heads 24 are preferably arranged such that the welding horns 26 are staggered across the length of the roller 22, with preferably slightly overlapping ends, whereby uninterrupted welding can occur across the entire width of the sheeting 40. In practice, to produce sheeting 40 having a width on the order of 48 inches, seven welding heads 24 each with a horn 26 of about seven and one quarter inches (18 cm) in width may advantageously be used. In such case, the horns 26 may be overlapping at their ends by about one-sixteenth inch (1.6 mm).

Figure 8:
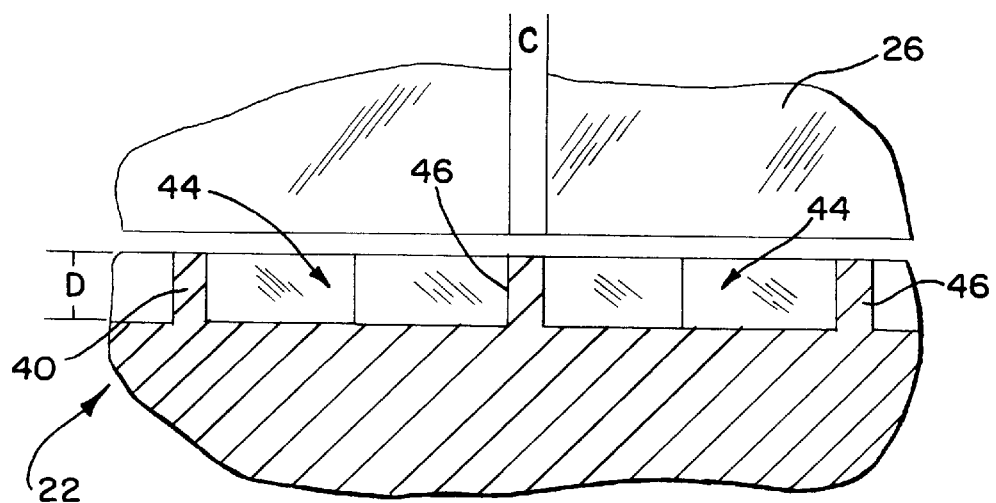
FIG. 8 is an enlarged partial cross-sectional view of a patterned roller for constructing the cellular retroreflective sheeting in accordance with the present invention.

Turning now to FIG. 8, the patterned roller 22 can be seen in an enlarged cross-section to include a repeating pattern of closed cells 44 defined by upstanding walls 46. Preferably, the walls 46 have a thickness on the order of 0.010 inch (0.25 mm), as measured at C, and have a height of on the order of 0.015 inch (0.38 mm), as measured at D. The roller 22 is preferably an eight inch (20 cm) diameter steel cylinder in which the pattern of cells 44 has been etched. In one preferred form, the cell 44 pattern is an array of mutually adjoining, like-size hexagons, each having an area of approximately 0.015 square inch (0.1 square cm) and measuring approximately 0.15 inch (3.8 mm) across.

Figure 9:
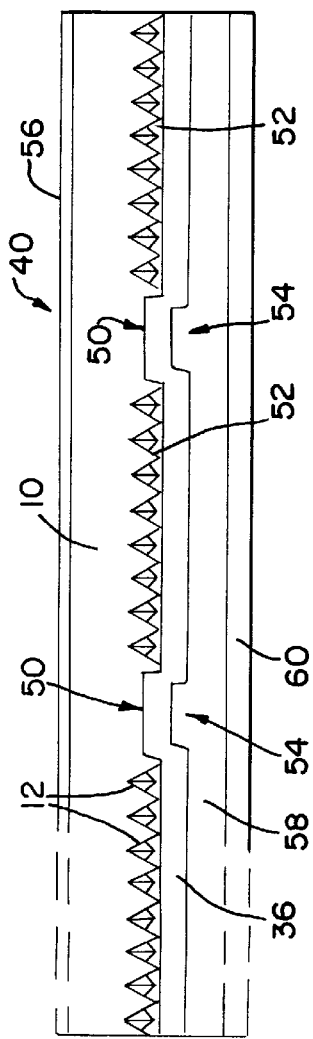
FIG. 9 is an enlarged cross-sectional view of a portion of cellular retroreflective sheeting constructed according to the present invention.

In FIG. 9, an example of cellular retroreflective sheeting 40 constructed using machine 20 is shown in enlarged cross-section. As seen therein, the web of retroreflective film 10 having its cube corner retroreflective elements 12 facing downwardly is covered by backing film 36 and welds 50 formed in the pattern of the roller 22 bond the films 10 and 36 together to create hermetically sealed cells 52 of multiple cube retroreflective elements 12. In practice, the welds 50 will form a pattern of recesses 54 in the facing side of the backing film 36 corresponding to the pattern of the roller 22. In the illustrated form of sheeting 40, and in a manner well-known in the art, the retroreflective film 10 may be formed at the time of embossing with a layer 56 of highly UV stabilized acrylic such that the sheeting 40 may have increased resistance to deterioration under exposure to sunlight. As also known, a layer of suitable adhesive 58 may be applied directly to the backing layer 36, covered by a release liner 60, such that the sheeting 40 is ready to apply to a structure, such as a sign blank, for example. The release liner 60 may in practice be a variety of suitable materials such as polyethylene, polyester or paper.

It can now be appreciated that the machine 20 of the present invention is capable of continuously constructing cellular retroreflective sheeting 40 having enhanced reflectivity over prior art sheeting constructions. It is not necessary to provide cell walls in the substrate material. The walls 46 of the patterned roller 22 need be no thicker than 0.010 inch (0.25 mm) in order to obtain an acceptably strong bond between the substrate film 10 and backing film 36 with a pattern of cells 44 on the order of about 0.015 square inch (0.1 square cm), each cell containing approximately 300 cube-corner reflective elements 12. Moreover, the ultrasonic welding action of the welding horns 26 creates welds 50 which are accurately formed and highly localized approximately to the thicknesses of the cell walls 46. Thus, residual heat distortion of the retroreflective elements 12 adjacent the welds 50 is minimized. The result is a cellular hermetic air gap sheeting 40 capable of enhanced retroreflectivity at relatively wide angles of incident light.

Also, because the present cellular sheeting 40 does not involve the use of chemical bonding processes, environmental issues in its manufacture are completely avoided. Further, rates of speed in production can be achieved far surpassing those of chemical processes. Production rates of at least twenty feet (6 m) per minute can be readily accomplished using the present technique.

Figure 10:
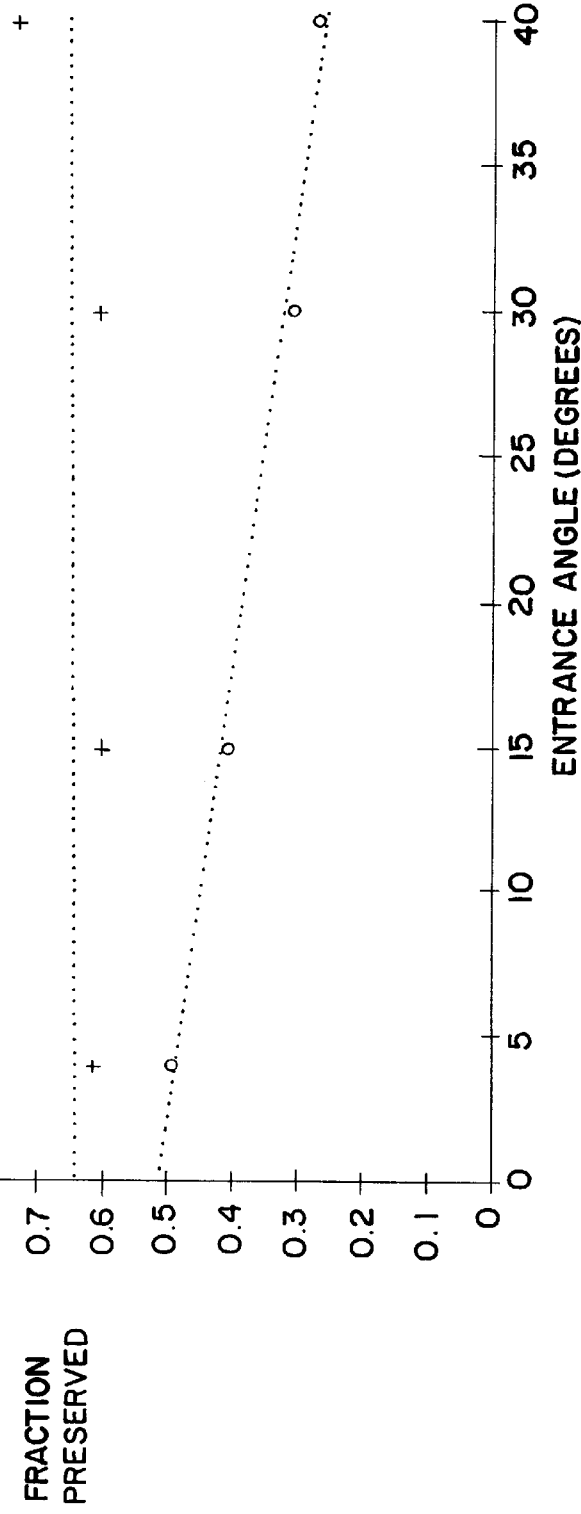
FIG. 10 is a graph comparing reflectivity of the prior art silica-backed sheeting to the sheeting of the present invention.

A preferred material for the backing film 36 is a highly flexible acrylic copolymer having a white opaque color. This backing film 36 together with the improved air gap system of cube-corner type reflectors provides a sheeting 40 having exceptional brilliance over prior art sheeting. For example, in one preferred embodiment, applicant's assignee processes a 48 inch (122 cm) wide roll of film 10 at a speed of twenty feet (6 m) per minute to provide the sheeting 40. In this instance, the substrate film is 0.006 inch (0.15 mm) thick acrylic having about 22,000 cube-corner elements per square inch (3,400 per square cm), as heretofore described. The backing film 36 is an acrylic copolymer on the order of 0.002 inch (0.05 mm) thick. The cell walls 46 were 0.15 inch (3.8 mm) wide and hexagonally shaped. The cellular sheeting 40 thus produced compares to the aforementioned silica-backed sheeting very favorably. For example, FIG. 10 illustrates a reflectivity comparison between the present sheeting 40 and the silica-backed sheeting showing that the specific intensity per unit area of the present sheeting is considerably greater particularly at large angles of incident light. In fact, the reflectivity is greater at all incident angles due to the reduced amount of sheeting dead area dedicated to formation of cell walls. In another test, whiteness was compared as defined by CIE chromaticity coordinates, 2 degree observer D65 source 0/45 geometry and yielded the following results:

|  | | Color Values | |
| --- | --- | --- | --- |
|  | Y | x | y |
| Silica-backed | 55.54 | 0.3119 | 0.3324 |
| Sonically welded | 48.57 | 0.3009 | 0.3287 |

A suitable welding head 24 for practicing the invention is a Model 900 ao machine manufactured by Branson Ultrasonics Corporation of Banbury, Conn. having a vibration rate of 20,000 times per second and having stepped horns 26. Also, as shown in FIG. 3, although the welding process does not generate inordinate amounts of heat, an air knife 56 may be positioned adjacent the roller 22 to cool the sheeting 40 after welding and avoid any adverse effects of built-up heat in the welding horns 26 or roller 22 which could transfer to the sheeting 40. Further, the roller 22 could also be designed to have a flow of constant temperature fluid through it if further temperature control of the welded sheeting 40 is desired.

An important advantage of the present invention is that cube-corner elements having different optical characteristics (defined by cube shape, size, tilt, etc.) may be used to greater advantage, as no allowance need be provided to define cell walls in the substrate film, the walls instead being defined during welding by the walls on the roller.

While the present invention has been described in connection with preferred embodiments thereof, it will be apparent to those skilled in the art that many changes and modifications may be made without departing from the true spirit and scope of the invention. Accordingly, it is intended by the appended claims to cover all such changes and modifications as come within the true spirit and scope of the invention.

What is claimed is:

1. A method of forming flexible retroreflective hermetically sealed cellular sheeting comprising the steps of:

providing a first thin continuous thermoplastic film having a plurality of cube-corner retroreflective elements formed on one face thereof;

providing a second thin continuous backing film of thermoplastic material;

juxtaposing said first and second films with said second film covering said retroreflective elements;

passing said juxtaposed films over a patterned roller with said second backing film in contact with said roller, said roller having a continuous array of upstanding closed walls defining cells; and applying sonic vibration to said juxtaposed films at said roller as said juxtaposed films are passed thereover to thereby form continuous welds between said films in the pattern of the roller, whereby said welds form discrete hermetically-sealed cells of multiple retroreflective elements thereon with air gaps between said elements and said second film and thereby providing a cellular retroreflective sheeting.

2. The method of claim 1 wherein said continuous cell walls are approximately 0.010 inch in thickness.

3. The method of claim 1 wherein said vibration is applied by a plurality of ultrasonic welding horns disposed lengthwise of the longitudinal axis of said roller.

4. The method of claim 3 wherein said welding horns are arranged in staggered relation along the length of said roller.

5. The method of claim 4 wherein said welding horns overlap to assure continuous weld.

6. The method of claim 1 including the step of directing air against said welding sheeting to thereby cool said sheeting.

7. The method of claim 1 including the step of conducting liquid through said roller to thereby control the temperature of said roller.

\* \* \* \* \*